M. ZOFCHAK.
ANIMAL LIFE PRESERVER.
APPLICATION FILED OCT. 29, 1917.

1,265,580.

Patented May 7, 1918.

Inventor
Michael Zofchak.

Witnesses
Paul M. Hunt
N. L. Collamer

By Victor J. Evans
Attorney

UNITED STATES PATENT OFFICE.

MICHAEL ZOFCHAK, OF PITTSBURGH, PENNSYLVANIA.

ANIMAL LIFE-PRESERVER.

1,265,580.   Specification of Letters Patent.   Patented May 7, 1918.

Application filed October 29, 1917. Serial No. 199,030.

*To all whom it may concern:*

Be it known that I, MICHAEL ZOFCHAK, a citizen of the United States, residing at Pittsburgh, in the county of Allegheny and State of Pennsylvania, have invented new and useful Improvements in Animal Life-Preservers, of which the following is a specification.

This invention relates to life preservers, and more especially it is intended for quick application to a draft horse, pack mule, or other animal which is carrying war supplies and which may possibly be a cavalry horse, so that when a stream or river is reached the animal can swim across with his load and possibly with his driver and the necessity for building a bridge is avoided.

The object of the invention is to specially construct a preserver of this kind so that it may be quickly applied to the horse without removing his harness or his pack.

This object is carried out in the manner hereinafter more fully described and claimed, and as shown in the drawings wherein:—

Figure 1:
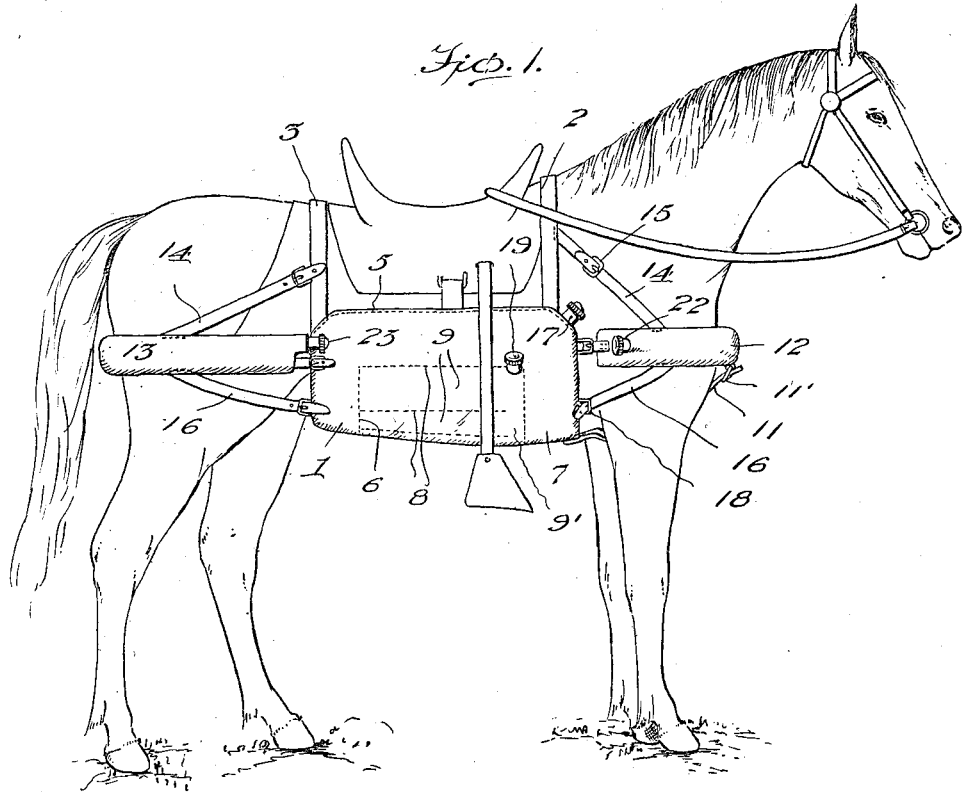
Figure 1 is a side elevation of a horse equipped with this life preserver, showing the same put on over the belt which carries the saddle, and illustrating the usual harness for holding the saddle in place.
Figure 2:
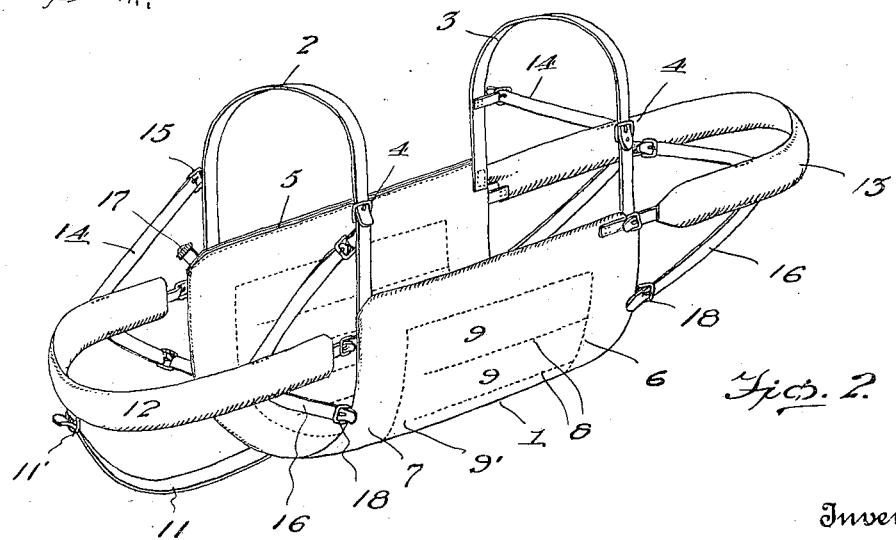
Fig. 2 is a perspective view of the preserver removed from the horse.

The animal illustrated in Fig. 1 is a horse, and we may assume that it is a cavalry horse on which is strapped a saddle having the usual stirrups and other straps for the convenience of the driver and the purpose of holding the saddle in place. I have not thought it necessary to illustrate the driver and the kit or equipment he carries, and Fig. 1 may be taken as typical of any kind of an army animal carrying a driver or a load, either in the shape of a pack of supplies or perhaps a machine gun mounted on his back. It is well known that when a heavily laden draft animal comes to a stream which he might willingly swim under other conditions, he is liable to become unruly when he finds that he can not swim as easily as usual, and it is possible that the swiftness of the current may carry him away. Therefore the pack train or the cavalry regiment is usually preceded by a corps of engineers to build bridges over streams too deep to be forded. It is the purpose of the present invention to provide a life preserver for quick application to the pack animal so that he can swim such streams with his load on, and therefore to an extent do away with the necessity of bridges in the circumstances mentioned.

Coming now to the details of the present case, the numeral 1 designates the main preserver which is of sufficient size to pass under the belly of the horse as seen in Fig. 1 and which has straps 2 and 3 at one side long enough to lead over the horse's back and connect with buckles 4 at his other side when the device is applied. This preserver is formed from rubber sheets in two thicknesses sewed together around their edges on the line 5 and again sewed together near the marginal line on the line 6 to produce what might be called a frame 7 having its own inflating nipple 17. Within the frame are parallel rows of stitches 8 connected at one end with the stitches 6 and spaced at the other end therefrom, thereby producing a grid composed of a number of duplicate fingers 9 connected with each other across the front end of the device as at 9' and the connection having its own inflating nipple 19 whereby the entire grid can be blown up.

A breast tube 12 also of rubber or similar material extends around the animal's chest and has its own inflating nipple 22, and a rump tube 13 extends around its rump and has its own inflating nipple 23. Tabs 14 lead upward from these tubes obliquely and are connected by straps and buckles 15 with the front and rear back straps 2 and 3, and other tabs 16 lead downwardly from the breast and rump tubes and are connected by buckles 18 with the front and rear ends of the main preserver. A breast strap 11 is connected with the center of the breast tube, leads down between the fore legs and is connected by a buckle 11' with the front end of the main preserver as will be clear. Aside from this strap and its connections, the others are duplicated at the far side of the animal and are therefore hidden in Fig. 1, but all of the inflating nipples are by preference on one side of the apparatus.

The use of this device is as follows: Let us assume that for each animal one of these preservers in its deflated condition is stored away somewhere on his own back or in the kit he carries. When now a stream is reached the driver or muleteer takes this preserver out of the pack, opens it, quickly applies the main preserver beneath the belly of the animal, carries the straps over his back and buckles them, passes the chest and rump tubes around the chest and rump as shown and buckles them to the main preserver and their tabs to the buckles as indicated. The use of these tabs permits the adaptation of the device to animals of different sizes, both as to the length and the girth of his body. The various parts of the device are now inflated, either by blowing into the nipples or by applying an air pump thereto as well understood. The animal is then driven forward and down into the stream, and as soon as he gets to a depth where he can no longer wade he observes that a large percentage of his weight is sustained by this preserver; and all he has to do is work his legs in the act of swimming. Having reached the opposite shore, the attendant removes the device, or possibly it might be left on the animal as it weighs very little. Attention is invited to the fact that the device acts as a guard while the horse is in the water because it is submerged only a slight distance beneath the surface, and if floating logs or lumber should strike his flank he is not injured thereby because he is protected by this guard. In fact the device also serves as a guard if the device is worn while the animal is walking, and especially if he is pushing his way through underbrush or is otherwise used in a position where he is likely to be hurt.

A striking feature of my invention consists in dividing the device into a main preserver and chest and rump tubes, and also in sub-dividing the main preserver. If the animal be not heavily laden, it may not be necessary or desirable to inflate the chest and rump tubes, either or both of them; and also it may not be desirable to inflate the grid within the main preserver, as the buoyancy of the inflated frame will be sufficient. Again the muleteer or driver will know the tendency of certain animals, as one may need to have his fore-quarters kept well out of the water and another his hind quarters, and he will inflate the breast tube or rump tube accordingly. Also I find it is highly desirable to make the device in parts because if one part should become punctured or injured, it could be replaced by another. This is especially true of the main preserver which may well be of such size that the inflation of the frame or the grid will support a well laden animal without the necessity for inflating both, although both might be inflated if desired. Air pumped in through the nipple 19 flows along the connection 9' and down all the fingers 9 between the stitches 8 and within the stitches 6, and in this way a single nipple is sufficient for inflating the comparatively large grid. I reserve the right to use other forms of connections instead of the straps and buckles, but doubtless these will be employed as they are common in harness.

What is claimed is:—

1. In an animal life preserver, the combination with a water-proof pouch of a size to underlie the animal's belly and sub-divided into a central compartment and a frame compartment surrounding it, and means for inflating the compartments selectively; of a harness for fastening the device upon the animal.

2. A life preserver comprising a pouch of water-proof fabric made of two sheets stitched together around their edges, an inner line of stitching paralleling the marginal line and forming a frame, a nipple for inflating this frame, parallel rows of stitches within the frame forming fingers and leaving one end of all the fingers in connection with each other, and a nipple for inflating the connection.

3. In a life preserver for animals, the combination with a main preserver to underlie the animal's belly, and straps and buckles for holding it in place; of a breast tube and a rump tube, means for selectively inflating either, and detachable connections between these tubes and the front and rear end of said main preserver.

4. In a life preserver for animals, the combination with a main preserver to underlie the animal's belly, and straps and buckles for holding it in place; of an inflatable tube passing around the animal's breast and another passing around his rump, nipples in said tubes for selectively inflating them, and tabs and buckles projecting from said tubes and carried by the main preserver for detachably connecting the same to the preserver, as described.

In testimony whereof I affix my signature.

MICHAEL ZOFCHAK.

Copies of this patent may be obtained for five cents each, by addressing the "Commissioner of Patents, Washington, D. C."